(12) United States Patent
Xia et al.

(10) Patent No.: US 12,196,572 B2
(45) Date of Patent: Jan. 14, 2025

(54) METHOD FOR AUTOMATICALLY PRODUCING MAP DATA, AND RELATED APPARATUS

(71) Applicant: Beijing Baidu Netcom Science Technology Co., Ltd., Beijing (CN)

(72) Inventors: Deguo Xia, Beijing (CN); Jizhou Huang, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 279 days.

(21) Appl. No.: 17/961,930

(22) Filed: Oct. 7, 2022

(65) Prior Publication Data

US 2023/0041943 A1 Feb. 9, 2023

(30) Foreign Application Priority Data

Dec. 23, 2021 (CN) .......................... 202111589727.4

(51) Int. Cl.
G01C 21/00 (2006.01)
(52) U.S. Cl.
CPC ................................ G01C 21/3811 (2020.08)
(58) Field of Classification Search
CPC ............................................... G01C 21/3811
See application file for complete search history.

(56) References Cited

U.S. PATENT DOCUMENTS 8,843,340 B2 * 9/2014 Oohashi ............... G01C 21/188
701/411
10,928,830 B1 * 2/2021 Tran ....................... B60W 30/12
(Continued)

FOREIGN PATENT DOCUMENTS

| CN | 110287276 A | 9/2019 |
| CN | 111625612 A | 9/2020 |

(Continued)

OTHER PUBLICATIONS

Bai et al, "Monocular Outdoor Semantic Mapping with a Multi-task Network," 2019 IEEE/RSJ International Conference on Intelligent Robots and Systems, Nov. 4-8, 2019, 6 pages.

(Continued)

*Primary Examiner* — Ramsey Refai
(74) *Attorney, Agent, or Firm* — Seed IP Law Group LLP

(57) ABSTRACT

The present disclosure provides a method and apparatus for automatically producing map data. The method includes: performing track rectification on crowdsourcing tracks based on corresponding standard tracks, and locating each map element included, based on depth information of track point images included in the rectified crowdsourcing tracks; comparing a latest map element obtained based on the rectified crowdsourcing tracks locating and an old map element at a corresponding locating position using a pre-built entity semantic map; determining, in response to a change in the latest map element compared to the old map element, a target processing method according to a processing standard of a changed map element pre-abstracted from a map element update specification; and processing the latest map element according to the target processing method to obtain a processed latest map.

20 Claims, 8 Drawing Sheets

(56) References Cited

U.S. PATENT DOCUMENTS

| | | | | |
|---|---|---|---|---|
| 10,962,982 | B2* | 3/2021 | Fridman | G01C 21/3822 |
| 2009/0254275 | A1* | 10/2009 | Xie | G01C 21/005 |
| | | | | 701/469 |
| 2011/0320155 | A1* | 12/2011 | Oohashi | G01C 21/30 |
| | | | | 702/95 |
| 2018/0025235 | A1* | 1/2018 | Fridman | G01C 21/3852 |
| | | | | 382/103 |
| 2020/0342760 | A1* | 10/2020 | Vassilovski | G08G 1/161 |
| 2022/0309835 | A1* | 9/2022 | Hu | G06T 7/246 |
| 2023/0152121 | A1* | 5/2023 | Li | G01C 21/12 |
| | | | | 701/434 |
| 2024/0159857 | A1* | 5/2024 | Li | G06F 16/29 |

FOREIGN PATENT DOCUMENTS

| | | | |
|---|---|---|---|
| CN | 111656135 | A | 9/2020 |
| CN | 112132754 | A | 12/2020 |
| CN | 113407559 | A | 9/2021 |

OTHER PUBLICATIONS

Compton et al., "PeerAppear: A P2P Framework for Collaborative Visual Localization," 29th International Technical Meeting of The Satellite Division of the Institute of Navigation, Nov. 2016, 11 pages.

Ma et al., "Exploiting Sparse Semantic HD Maps for Self-Driving Vehicle Localization," 2019 IEEE/RSJ International Conference on Intelligent Robots and Systems, Nov. 4-8, 2019, 8 pages.

Stoven-Dubois et al., "A Collaborative Framework for High-Definition Mapping," 2019 IEEE Intelligent Transportation Systems Conference, Oct. 27-30, 2019, 6 pages.

Wong et al., "Vision-Based Vehicle Localization Using a Visual Street Map with Embedded SURF Scale," Lecture Notes in Computer Science, vol. 8925, Jan. 1, 2015, 13 pages.

Zhanabatyrova et al, "Automatic Map Update Using Dashcam Videos," arXiv:2109.12131v1, Sep. 24, 2021, 14 pages.

* cited by examiner

METHOD FOR AUTOMATICALLY PRODUCING MAP DATA, AND RELATED APPARATUS

This patent application claims the priority of Chinese Patent Application No. 202111589727.4, filed on Dec. 23, 2021, and entitled "Method for Automatically Producing Map Data, Related Apparatus, and Computer Program Product", the entire content of which is herein incorporated by reference.

TECHNICAL FIELD

The present disclosure relates to the technical field of data processing, in particular to the technical field of artificial intelligence such as intelligent navigation and deep learning, which may be applied to intelligent traffic scenarios, and more particularly, to a method and apparatus for automatically producing map data, an electronic device, and a computer readable storage medium.

BACKGROUND

Navigation electronic maps, while providing travel services for hundreds of millions of users, are also playing an increasingly important and indispensable role in various industries as a digital base for new infrastructure. For map products, data is the infrastructure for survival, accuracy is the lifeline of maps, and timeliness is an essential ability for maps to describe the real world.

SUMMARY

Embodiments of the present disclosure provide a method and apparatus for automatically producing map data, an electronic device, and a computer readable storage medium.

In a first aspect, an embodiment of the present disclosure provides a method for automatically producing map data. The method includes: performing track rectification on crowdsourcing tracks based on corresponding standard tracks, and locating each map element in track point images included in the rectified crowdsourcing tracks, based on depth information of the track point images; comparing a latest map element obtained based on the rectified crowdsourcing tracks locating and an old map element at a corresponding locating position using a pre-built entity semantic map; determining, in response to a change in the latest map element compared to the old map element, a target processing method according to a processing standard of a changed map element pre-abstracted from a map element update specification; and processing the latest map element according to the target processing method to obtain a processed latest map.

In a second aspect, an embodiment of the present disclosure provides an apparatus for automatically producing map data. The apparatus includes: a map element locating unit, configured to perform track rectification on crowdsourcing tracks based on corresponding standard tracks, and locate each map element in track point images included in the rectified crowdsourcing tracks, based on depth information of the track point images; an element comparing unit, configured to compare a latest map element obtained based on the rectified crowdsourcing tracks locating and an old map element at a corresponding locating position using a pre-built entity semantic map; a target processing method determining unit, configured to determine, in response to a change in the latest map element compared to the old map element, a target processing method according to a processing standard of a changed map element pre-abstracted from a map element update specification; and a change element processing unit, configured to process the latest map element according to the target processing method to obtain a processed latest map.

In a third aspect, an embodiment of the present disclosure provides an electronic device. The electronic device includes: at least one processor; and a memory communicatively connected to the at least one processor. The memory stores instructions executable by the at least one processor, and the instructions, when executed by the at least one processor, cause the at least one processor to perform the method for automatically producing map data according to any implementation in the first aspect.

In a fourth aspect, an embodiment of the present disclosure provides a non-transitory computer readable storage medium storing computer instructions. The computer instructions are used to cause a computer to perform the method for automatically producing map data according to any implementation in the first aspect.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

After reading detailed descriptions of non-limiting embodiments with reference to the following accompanying drawings, other features, objectives, and advantages of the present disclosure will become more apparent.

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description. It should be noted that the embodiments in the present disclosure and features in the embodiments may be combined with each other on a non-conflict basis.

In the technical solution of the present disclosure, the collection, storage, usage, processing, transmission, provision and disclosure of the user personal information involved are all in compliance with the provisions of relevant laws and regulations, and do not violate public order and good customs.

Figure 1:
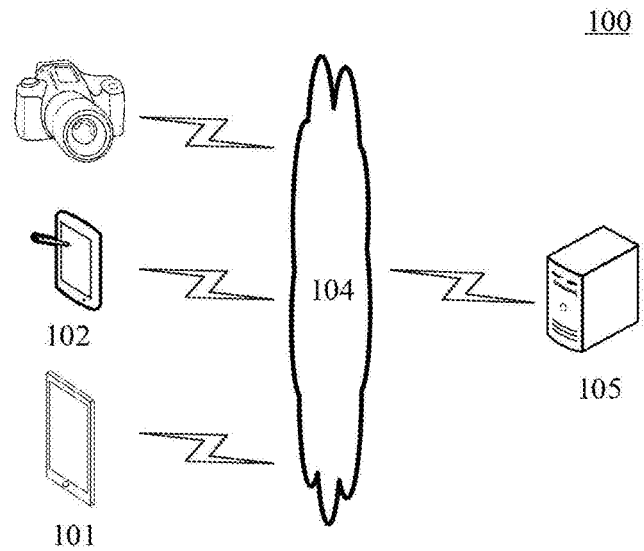
FIG. 1 is an example system architecture in which embodiments of the present disclosure may be applied.

FIG. 1 illustrates an example system architecture 100 to which embodiments of a method and apparatus for automatically producing map data, an electronic device, and a computer readable storage medium of the present disclosure may be applied.

As shown in FIG. 1, the system architecture 100 may include terminal devices 101, 102, and 103, a network 104, and a server 105. The network 104 serves as a medium providing a communication link between the terminal devices 101, 102, 103, and the server 105. The network 104 may include various types of connections, such as wired or wireless communication links, or optical cables.

A user may use the terminal devices 101, 102, 103 to interact with the server 105 via the network 104 to receive or send messages and the like. Various applications for implementing information communication between the terminal devices 101, 102, 103 and the server 105 may be installed, such as image capturing applications, map data updating applications, instant messaging applications.

The terminal devices 101, 102, and 103 may be represented by different forms of hardware, such as various personal electronic devices having image capturing capabilities, including but not limited to smart phones, tablet computers, cameras, smart watches, smart glasses, and the like. The server 105 may be hardware or software. When the server 105 is hardware, it may be implemented as a distributed server cluster composed of a plurality of servers, or as a single server; when the server is software, it may be implemented as a plurality pieces of software or a plurality of software modules, or as a single piece of software or a single software module, which is not specifically limited herein.

The server 105 may provide various services through various built-in applications. Using a map data update application that may implement a map data update service as an example, the server 105 may achieve the following effects when running the map data update application: first, receiving crowdsourcing tracks obtained by photographing a certain area from the terminal devices 101, 102, 103 via the network 104, then acquiring standard tracks obtained by photographing the same area by professional equipment, where both the crowdsourcing tracks and the standard tracks include a plurality of track points, and each track point corresponds to at least one track point image; then, rectifying the crowdsourcing tracks based on matching image features in corresponding track point images between the crowdsourcing tracks and the standard tracks, to obtain the rectified crowdsourcing tracks; next, determining depth information of each map element in the track point images included in the rectified crowdsourcing tracks; and finally, locating each map element based on the depth information. Subsequently, the server may also continue to determine whether the located each map element has changed using a pre-built entity semantic map, determine a target processing method according to a processing standard of the changed map element pre-abstracted from a map element update specification, and finally update a changed map element reasonably according to the target processing method to realize update of map data.

The method for automatically producing map data provided by subsequent embodiments of the present disclosure is generally executed by the server 105 having strong computing power and more computing resources. Correspondingly, an apparatus for updating map data is generally also provided in the server 105. But at the same time, it should be noted that when the terminal devices 101, 102, and 103 also have computing power and computing resources that meet the requirements, the terminal devices 101, 102, and 103 may also use map data update applications installed thereon to complete the above operations that are assigned to the server 105, and then output a same result as that of the server 105. Especially when there are multiple types of terminal devices having different computing capabilities at the same time, when a map data update application determines that the terminal device where it is located has strong computing power and many remaining computing resources, the terminal device may be allowed to perform the above operations, so as to appropriately reduce computing pressure of the server 105. Correspondingly, the apparatus for automatically producing map data may also be installed in the terminal devices 101, 102, and 103. In this case, the example system architecture 100 may also not include the server 105 and the network 104.

It should be understood that the numbers of terminal devices, networks, and servers in FIG. 1 are merely illustrative. Any number of terminal devices, networks, and servers may be provided according to implementation needs.

Figure 2:
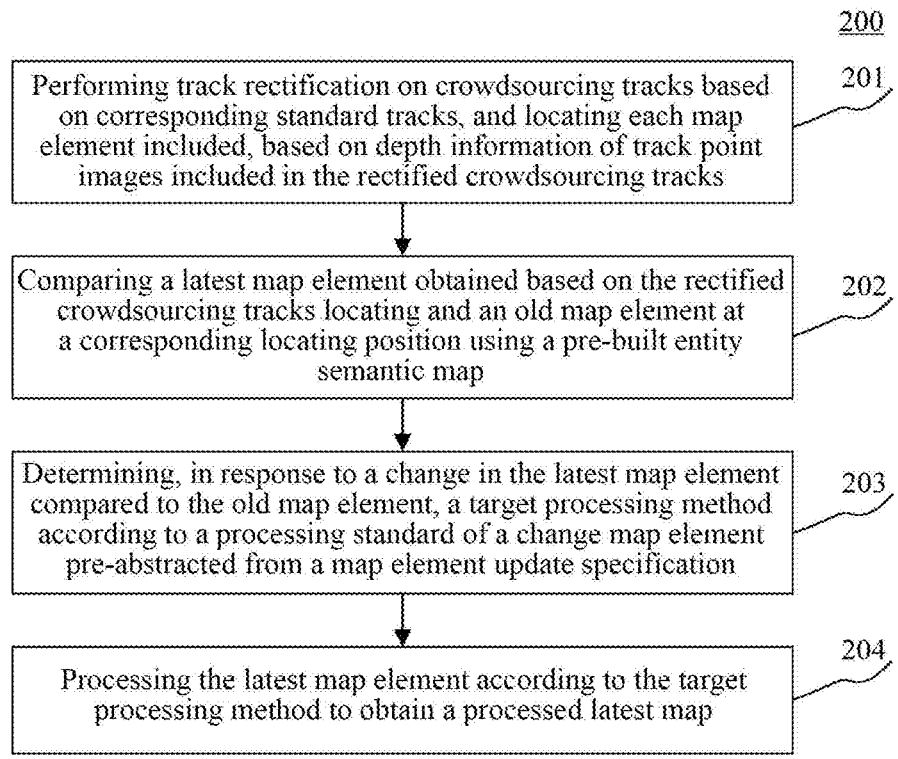
FIG. 2 is a flowchart of a method for automatically producing map data according to an embodiment of the present disclosure.

With reference to FIG. 2, FIG. 2 is a flowchart of a method for automatically producing map data according to an embodiment of the present disclosure, where a flow 200 includes the following steps.

Step 201: performing track rectification on crowdsourcing tracks based on corresponding standard tracks, and locating each map element in track point images included in the rectified crowdsourcing tracks, based on depth information of the track point images.

Map element locating is a very critical link. Only by accurately locating the positions of map elements, can we more accurately determine changes in the real world, and provide more accurate navigation broadcasts and reminders, to give users a better navigation and driving experience. Map element locating is a process of calculating to obtain coordinate locations of map elements in the real world through real-world data collected by collection devices.

Assuming a map element: 1) may be detected in a sequence image set $\mathcal{I} = \{I_1, I_2, \ldots, I_N\}$, where $I_i$ is a frame of image data triggered and collected at time $t_i$; and 2) corresponding collection device position information $\mathcal{L} = \{L_1, L_2, \ldots, L_N\}$, where $L_i$ is vehicle GNSS coordinate position information triggered and collected at time $t_i$; then, the position of the map element may be calculated as follows.

$\hat{L} = f(\mathcal{L}, \mathcal{L})$; where $f(*)$ is a visual locating method, which may use multi-view geometry, depth estimation or other deep learning methods.

Assuming the GNSS coordinate position of the map element in the real world is L: $\Delta L = d(L, \tilde{L})$, then a goal of element locating is to make $\Delta L$ as small as possible, where $d(*)$ is the Euclidean distance.

That is, in order to solve the problem of poor locating accuracy existing in massive crowdsourcing tracks, this step aims to provide a two-stage optimization method that first rectifies and then combines depth information, by an executing body (such as the server 105 shown in FIG. 1) of the method for automatically producing map data, to improve an accuracy of map element locating.

First stage: track rectification, based on standard tracks collected by professional collection devices, using a method of image feature matching in track point images, performing track rectification on crowdsourcing tracks collected by crowdsourcing users through personal collection devices, to solve the problems such as low locating accuracy, track drift of the crowdsourcing collection devices;

Second stage: depth estimation, element locating based on image monocular depth estimation, significantly improves a locating effect, effectively solves the problems such as various types of crowdsourcing collection devices, low accuracy of element locating caused by using the traditional multi-view geometry based method.

For the crowdsourcing tracks and the standard tracks in the first stage, both of which include a plurality of track points, and each track point corresponds to at least one track point image. It should be noted that the track points constituting the crowdsourcing tracks are not necessarily exactly the same as the track points constituting the standard tracks, that is, positions of the track points of the crowdsourcing tracks may be different from positions of the track points of the standard tracks.

The standard tracks are a sequence of track point images obtained by professional control of professional collection devices, such as by using high-precision lidars, high-definition camera devices, and parameters related to map element locating of these devices have been pre-adjusted to meet specifications, however, due to their high costs, the devices cannot be used for normalized acquisition of map data; and the crowdsourcing tracks are a sequence of track point images photographed by ordinary users using their own personal collection devices, such as smart phones, tablet computers, smart watches, pocket cameras, smart glasses. Such devices may be affected by internal parameters, external parameters, angles, lighting, etc., resulting in low locating accuracy of the devices, and problems such as drift may easily occur. In addition, the devices are complicated, resulting in huge differences in internal parameters, external parameters, angles, lighting, etc., which cannot be unified.

Step 202: comparing a latest map element obtained by locating based on the rectified crowdsourcing tracks and an old map element at a corresponding locating position using a pre-built entity semantic map;

Step 203: determining, in response to a change in the latest map element compared to the old map element, a target processing method according to a processing standard of a changed map element pre-abstracted from a map element update specification;

Step 204: processing the latest map element according to the target processing method to obtain a processed latest map.

After improvements on map element locating is realized in step 201, steps 202 to 204 provide improvements to a change analysis link on this basis.

The change analysis link mainly includes two parts: first, determining whether the element has changed. That is, determining whether the element is a newly-added element (there is no such element in the map data in the position, newly added in the real world, such as adding a speed limit of 60, adding an electronic eye), or whether the element is a modified element (there is the element in the map data in the position, but its type has changed, for example, the electronic eye changes from a ball shape to a gun shape, vehicle information changes from going straight to turning left, etc.); secondly, determining whether the change conforms to the map element update specification. That is, based on a production standard, an update specification of the map data, it is determined whether the change needs to be updated to the map data.

In order to meet the exchange and intercommunication of navigation data between different navigation systems, there are industry and national standards for the production standard of navigation electronic map data, which regulate how different elements are expressed in the map data. At the same time, there may be separate data expression requirements for different navigation business application requirements. The requirements for the production standard may cause semantic escaping between the map data and the real world.

Through investigation, the following problems are found.

1) An accuracy of determining whether the element changes based on the position alone is low. Some elements are located at $L_1$ in the real world, but in the map data are located at $L_1'$. For example, a speed limit on a ramp is generally located on a high-speed main road a certain distance before the ramp, but in the map data, for the convenience of navigation applications, the speed limit needs to be implemented on the ramp. In addition, when the positions of the same elements are very close, it is difficult to determine whether they are the same elements simply by comparing the positions. This may lead to the low accuracy of determining whether the element changes by directly comparing the location of the element with the map data; and 2) Whether the change conforms to the map element update specification is strongly dependent on manual labor. Some elements exist in the real world, but they do not need to be expressed in the map data. For example, if an electronic eye acts on a non-motorized lane or a community, since the electronic eye acting on the non-motorized lane or the community is of little value to driving users, the business value is low, even if it is a newly-added change, there is no need to output and update the change, that is, according to the map element update specification, this change does not need to be updated.

Therefore, in order to solve the above technical problems in the existing change analysis process, the present embodiment uses the solution provided in steps 202 to 204 to better determine changed map elements by means of the pre-built entity semantic map, and determines a reasonable update method for the changed map elements with the help of the processing standard of the changed map element abstracted from the map element update specification.

In order to better realize automatic update of the map data, the present embodiment disassembles it into two parts in sequence, that is, for a previous map element locating part, massive but imprecise crowdsourcing tracks are rectified by a small number of but accurate standard tracks, and at the same time, depth information is combined to achieve more accurate locating of map elements; for a latter map element change and update part, an semantic map that connects the real world and road network data from the semantic level is used to better determine a map elements with change, and finally complete reasonable update of the changed map element according to the target processing method determined from the processing standard of the changed map element, so as to improve an automatic production efficiency and accuracy of map data.

Figure 3:
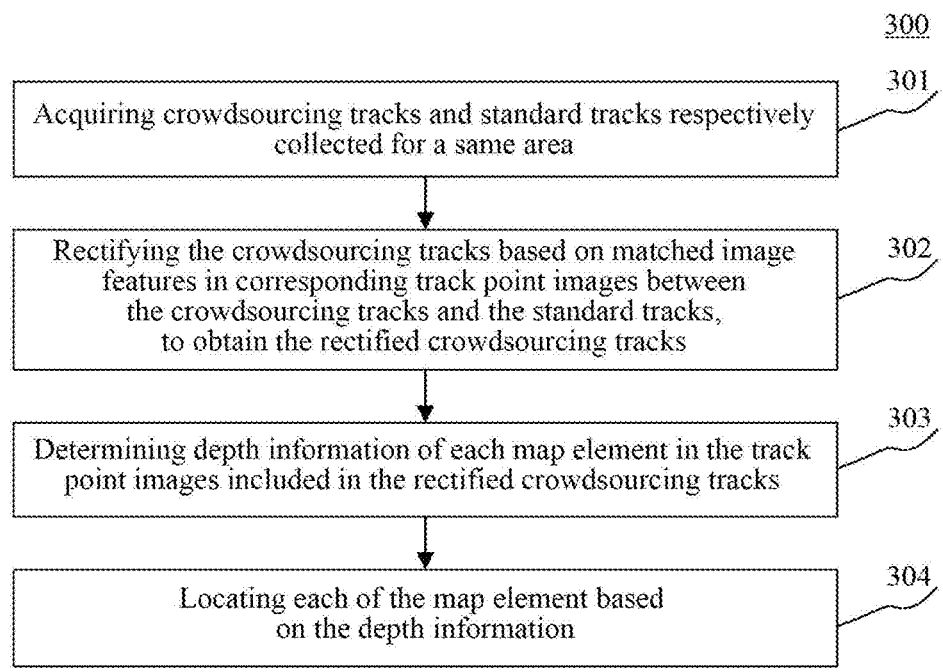
FIG. 3 is a flowchart of a method for locating a map element according to an embodiment of the present disclosure.

The following will describe the "map element locating" link and the "change analysis" link respectively, in order to deepen the understanding of how the improvements on each link is achieved:

The present embodiment provides a flowchart of a method for locating a map element through FIG. 3, where a flow 300 includes the following steps.

Step 301: acquiring crowdsourcing tracks and standard tracks respectively collected for a same area.

This step aims to acquire the crowdsourcing tracks and the standard tracks respectively collected for the same area, by an executing body (which may still be the server 105 shown in FIG. 1, or may be another server that can communicate with the server 105) of the method for locating a map element.

Step 302: rectifying the crowdsourcing tracks based on matched image features in corresponding track point images between the crowdsourcing tracks and the standard tracks, to obtain the rectified crowdsourcing tracks.

On the basis of step 301, this step aims to rectify the crowdsourcing tracks based on the matched image features in the corresponding track point images between the crowdsourcing tracks and the standard tracks, to obtain the rectified crowdsourcing tracks by the executing body.

Most of roads in the map data have been collected by professional collection devices before. Due to high locating accuracy of the professional collection devices, standardized professional collection personnel collecting in compliance with data collection standards, in this step, the standard tracks collected by the professional collection devices are used as basic tracks, and based on the matched image features in the images corresponding to matching track points, tracks of the crowdsourcing tracks collected by crowdsourcing are rectified, so as to solve the problems of low locating accuracy, track drift of the track point images in the crowdsourcing tracks.

Since the track points of the crowdsourcing tracks do not necessarily coincide with the track points of the standard tracks, when matching image features, standard track points that match the crowdsourcing track points should be determined first, and then, a matching operation of the features in the track point images is performed under this constraint.

Step 303: determining depth information of each map element in the track point images included in the rectified crowdsourcing tracks.

Step 304: locating each map element based on the depth information.

On the basis of step 302, steps 303 to 304 aim to determine the depth information of each map element in the track point images included in the rectified crowdsourcing tracks by the executing body, so as to more accurately locate each map element based on the determined depth information.

Monocular depth estimation is based on a single RGB (red green blue) image, estimating a distance of each pixel in the image relative to a photographing source. Unlike binocular systems such as human eyes, it is difficult to acquire, from an image photographed by a monocular system, a distance between an object in the image and a photographing device (hereinafter collectively referred to as its depth information), and the depth information can play a great role in locating a map element by visual means, can help to define relevant parameters in different crowdsourcing images photographed by different types of personal devices, so as to better locate the real position (or coordinates) of each map element.

The method for locating a map element provided by the present embodiment of the present disclosure rectifies the crowdsourcing tracks collected by crowdsourcing users through personal devices by using the standard tracks collected by professional equipment as the basis, so that massive but inaccurate crowdsourcing images may be effectively used to locate map elements, and by determining the depth information of each map element in the crowdsourcing images, the distance of the map element in the crowdsourcing images relative to the personal devices may be better determined, which in turn can more accurately locate the position of the map element in the real world.

Figure 4:
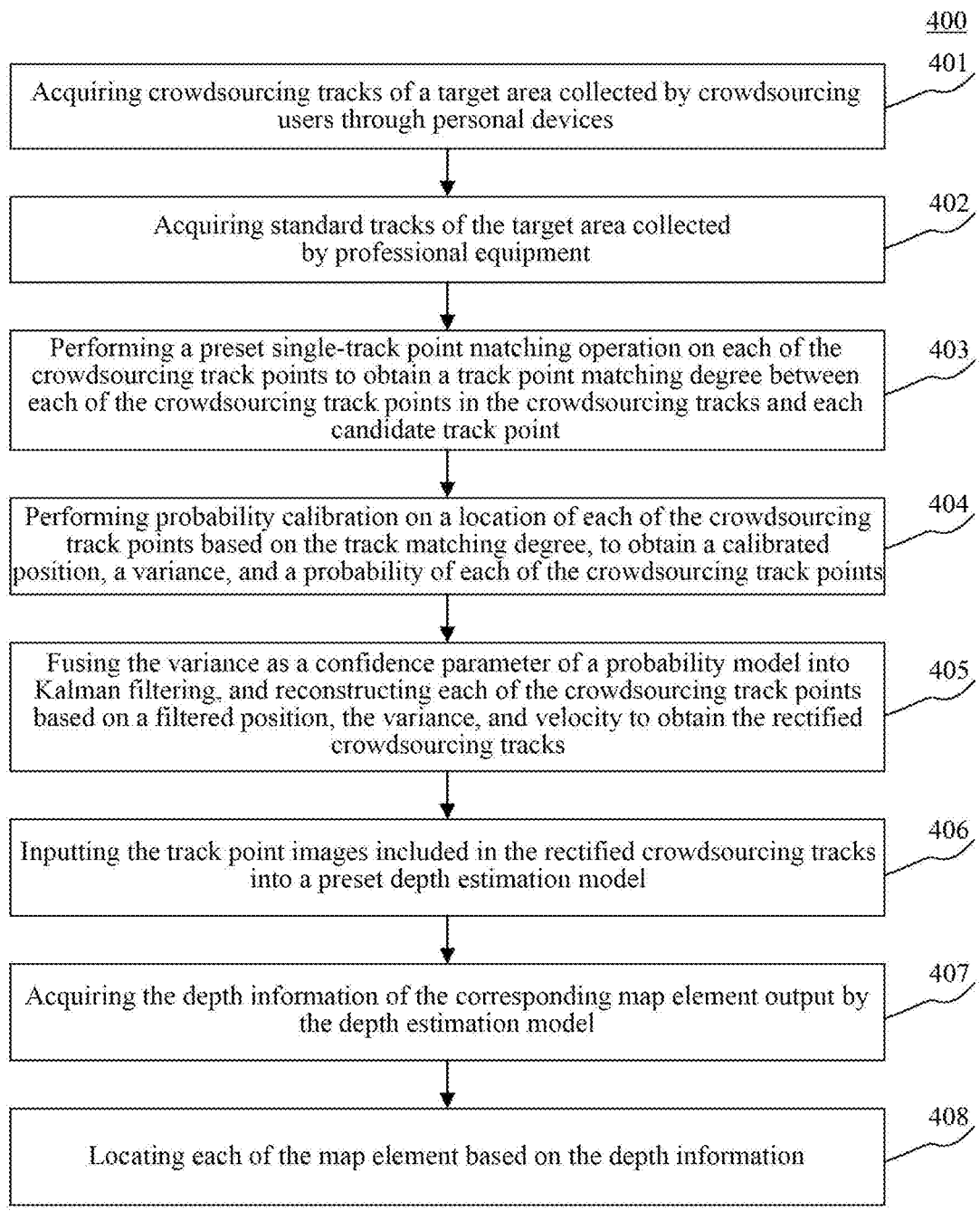
FIG. 4 is a flowchart of another method for locating a map element according to an embodiment of the present disclosure.

With reference to FIG. 4, FIG. 4 is a flowchart of another method for locating a map element according to an embodiment of the present disclosure, where a flow 400 includes the following steps.

Step 401: acquiring crowdsourcing tracks of a target area collected by crowdsourcing users through personal devices.

The crowdsourcing tracks include a plurality of crowdsourcing track points, and each of the crowdsourcing track points corresponds to at least one crowdsourcing image.

Step 402: acquiring standard tracks of the target area collected by professional equipment.

The standard tracks include a plurality of standard track points, and each of the standard track points corresponds to at least one standard image.

For step 201 in the flow 200, the present embodiment provides a more specific acquisition method through steps 401-403.

Step 403: performing a preset single-track point matching operation on each of the crowdsourcing track points to obtain a track point matching degree between each of the crowdsourcing track points in the crowdsourcing tracks and each candidate track point.

This step aims to perform the preset single-track point matching operation on each of the crowdsourcing track points to obtain the track point matching degree between each of the crowdsourcing track points in the crowdsourcing tracks and each candidate track point by the executing body. The candidate track point is a standard track point in the standard tracks that matches the corresponding crowdsourcing track point in a track point distance. Therefore, it can be known that the single-track point matching operation is an image feature matching operation of a track point image performed for a single track point.

Figure 5:
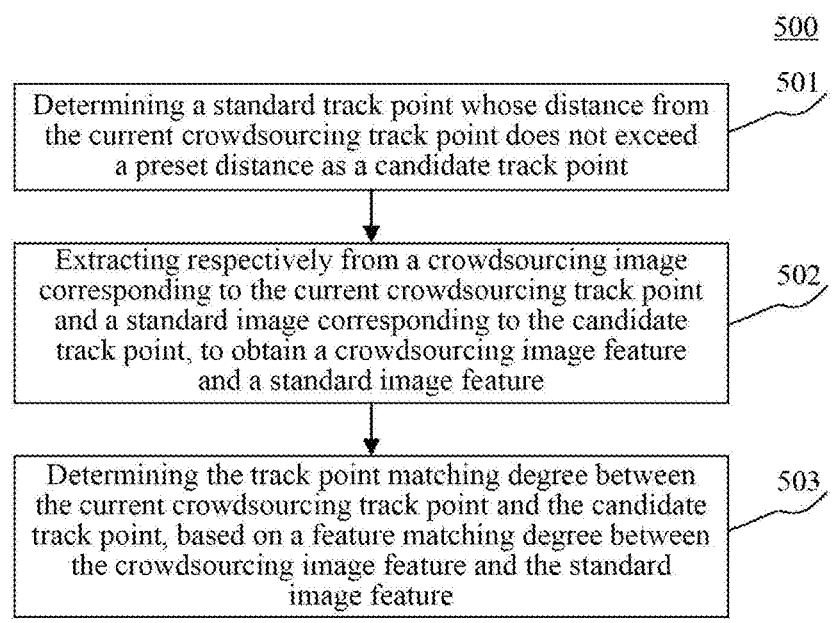
FIG. 5 is a flowchart of a single-track point matching operation according to an embodiment of the present disclosure.

In order to achieve the above purpose, the present embodiment also provides an example single track point matching operation flowchart through FIG. 5, and a flow 500 includes the following steps.

Step 501: determining a standard track point whose distance from the current crowdsourcing track point does not exceed a preset distance as a candidate track point;

Step 502: extracting respectively from a crowdsourcing image corresponding to the current crowdsourcing track point and a standard image corresponding to the candidate track point, to obtain a crowdsourcing image feature and a standard image feature; and Step 503: determining the track point matching degree between the current crowdsourcing track point and the candidate track point, based on a feature matching degree between the crowdsourcing image feature and the standard image feature.

Step 501 provides a distance-based method for selecting a candidate track point for the crowdsourcing track point, and step 502 performs feature extraction on images corresponding to each pair of matched crowdsourcing track point and candidate track point, so that step 503 finally determines the track point matching degree between the current crowdsourcing track point and the candidate track point by calculating the feature matching degree between the crowdsourcing image feature and the standard image feature.

Step 404: performing probability calibration on a location of each of the crowdsourcing track points based on the track matching degree, to obtain a calibrated position, a variance, and a probability of each of the crowdsourcing track points;

Step 405: fusing the variance as a confidence parameter of a probability model into Kalman filtering, and reconstructing each of the crowdsourcing track points based on a filtered position, variance, and velocity to obtain the rectified crowdsourcing tracks;

Steps 404 to 405 are mainly based on the principle of Kalman filtering to perform track calibration on a crowdsourcing track sequence having the track point matching degree: first, based on the track point matching degree, performing probability score calibration on the location of a single track point, to output the calibrated position, the variance, and a probability of each track point; then, using the variance of the probability model as the confidence indicator and fusing into Kalman filtering, and using the position, the variance, and the velocity as outputs to reconstruct the track, to realize continuous track rectification based on Kalman filtering, and finally obtain the rectified crowdsourcing tracks.

Step 406: inputting the track point images included in the rectified crowdsourcing tracks into a preset depth estimation model;

Step 407: acquiring the depth information of the corresponding map element output by the depth estimation model;

The depth estimation model is used to represent a corresponding relationship between a map image and depth information of a map element, performing training to obtain input samples in training samples of the depth estimation model as image data, and output samples as a depth map, and the depth map is obtained by registering point cloud data with the image data.

For example, in a supervised training mode, a 2D image obtained by photographing is used as an input sample, and a depth map obtained by corresponding labeling (recording depth information of each pixel) is used as an output sample for training. For example, a training sample set is $\mathcal{J}^D=\{(I_1, I_1^d), (I_2, I_2^d), \ldots, (I_N, I_N^d)\}$, which indicates that there are N training samples, I is the input 2D image sample and $I^d$ is the corresponding depth map.

On the basis of an existing visual collection device, a lidar collection device may be added to collect point cloud data while collecting 2D images, and the images and the point cloud data may be simultaneously registered using a locating device, the camera and the radar, to further obtain the depth map corresponding to the collected image of each frame.

For example, a Deep Residual U-Net deep neural network model may be used as a model framework of the depth estimation model, and then the depth map of the corresponding image may be predicted based on a monocular image, so as to achieve more accurate element locating. At the same time, by combining a pre-trained image classification task to initialize an Encoder network weight of the depth estimation model, an effect of depth estimation may be further improved.

Step 408: locating each of the map element based on the depth information.

Finally, based on rectified track coordinates of the collection devices, and the depth information obtained based on depth estimation, for an identified map element, its accurate coordinate position may be located.

On the basis of the embodiment shown in the flow 200, the present embodiment provides a complete and more specific map element locating solution through steps 401-408, which not only clarifies the acquisition sources of the crowdsourcing tracks and the standard tracks through steps 401-402, but also provides the two-stage crowdsourcing track rectification solution through steps 403-405, in which the matching degree between track points may be more accurately determined through the single-track point matching operation based on matching image features, and the subsequent processing based on the Kalman filter principle may finally obtain smoother rectified crowdsourcing tracks; at the same time, through steps 406 to 407, a depth information determination solution based on a preset depth estimation model is provided, in the training stage, the use of a training sample pair formed by the image data and the depth map obtained after the corresponding point cloud data registration, improves the locating accuracy of the determined map element as much as possible.

Figure 6:
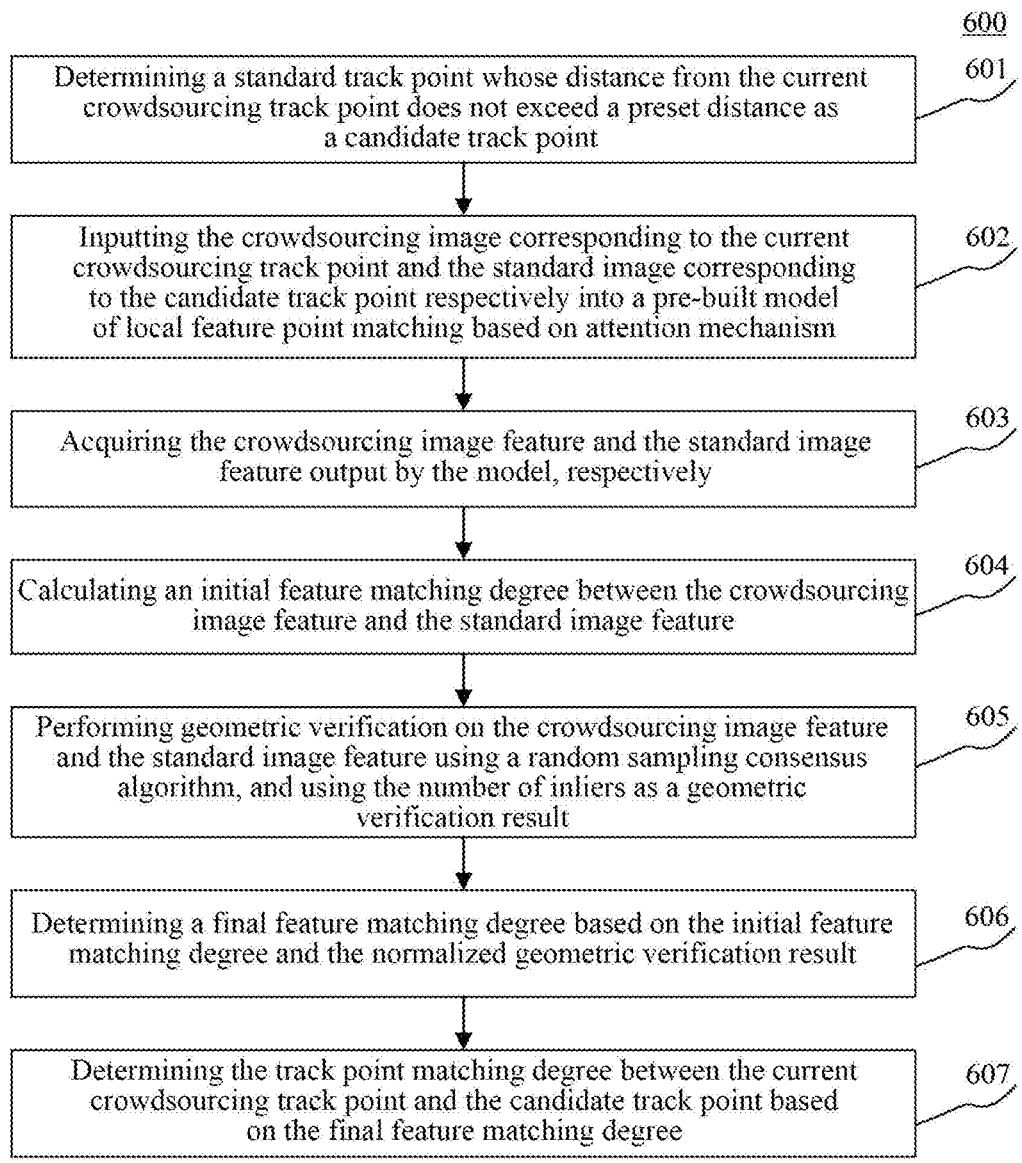
FIG. 6 is a flowchart of another single-track point matching operation according to an embodiment of the present disclosure.
Figure 7:
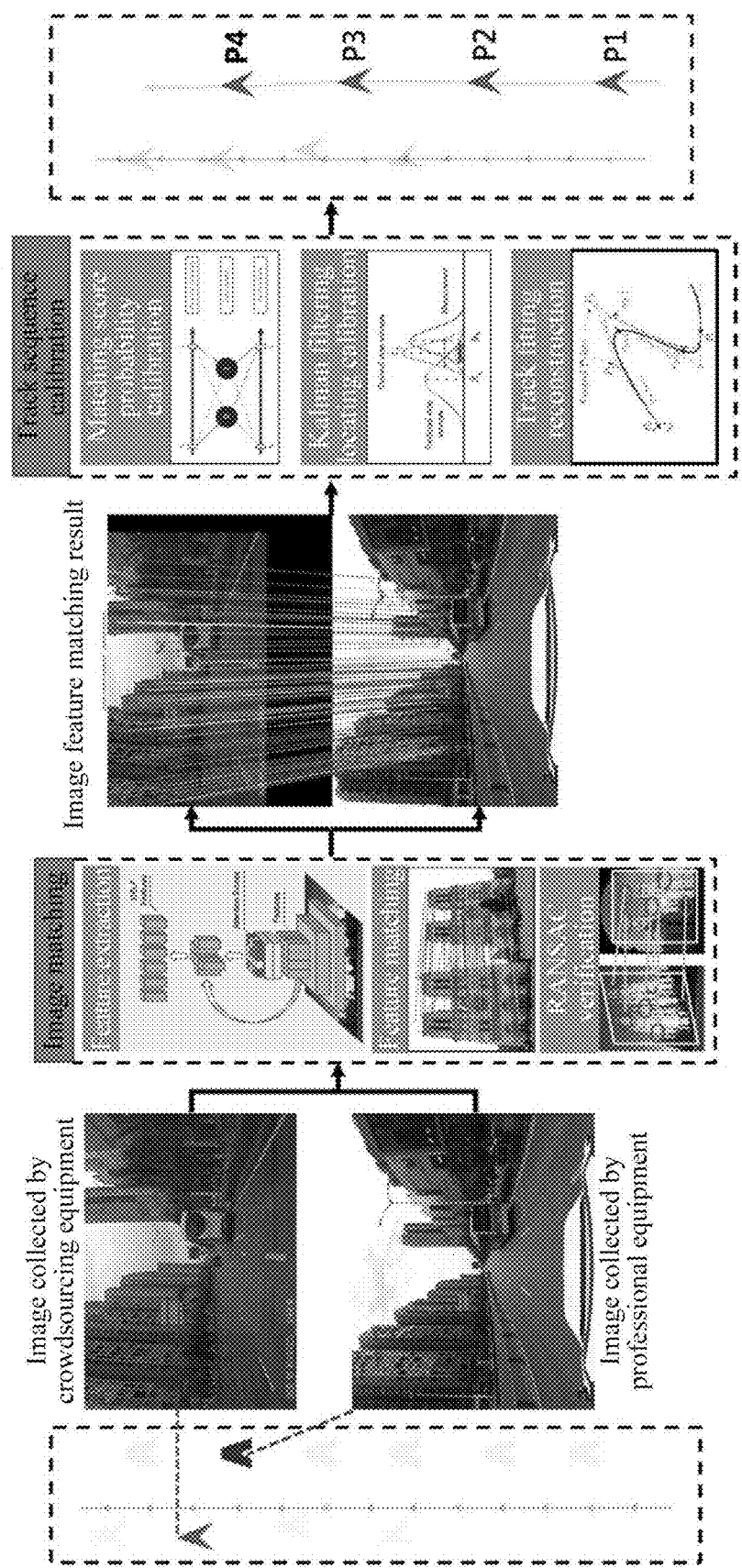
FIG. 7 is a step effect diagram of a method for locating a map element according to an embodiment of the present disclosure.

In order to better understand the single-track point matching operation, which is the key to the above embodiment, the present embodiment also describes in detail how to perform this operation with reference to FIG. 6 and FIG. 7, and a flow 600 includes the following steps.

Step 601: determining a standard track point whose distance from the current crowdsourcing track point does not exceed a preset distance as a candidate track point;

Step 602: inputting the crowdsourcing image corresponding to the current crowdsourcing track point and the standard image corresponding to the candidate track point respectively into a pre-built model of local feature point matching based on attention mechanism;

Step 603: acquiring the crowdsourcing image feature and the standard image feature output by the model, respectively;

Step 604: calculating an initial feature matching degree between the crowdsourcing image feature and the standard image feature;

Step 605: performing geometric verification on the crowdsourcing image feature and the standard image feature using a random sampling consensus algorithm, and using the number of inliers as a geometric verification result;

Step 606: determining a final feature matching degree based on the initial feature matching degree and the normalized geometric verification result;

Step 607: determining the track point matching degree between the current crowdsourcing track point and the candidate track point based on the final feature matching degree.

In order to facilitate the understanding of steps 601-607, an example will be given below.

Assuming that a track sequence $\mathcal{L}^C=\{L_1^c, L_2^c, \ldots, L_M^c\}$ collected by crowdsourcing has a total of M track points, each track point corresponds to an image set $\mathcal{J}^c=\{I_1^c, I_2^c, \ldots, I_M^c\}$, and this road section has a professional collected track sequence $\mathcal{L}^P=\{L_1^P, L_2^P, \ldots, L_N^P\}$ whose range includes $\mathcal{L}^c$, with a total of N track points, and each track point corresponds to an image collection $\mathcal{J}^P=\{I_1^P, I_2^P, \ldots, I_N^P\}$.

First, for a track point $L_i^c$ collected by crowdsourcing, a candidate track point set $\mathcal{L}_i^P=\{L_{i,1}^P, L_{i,2}^P, \ldots, L_{i,K}^P\}$ is determined in $\mathcal{L}^p$ according to a certain distance range front and rear (for example, no more than 10 meters apart).

Then, for an image $I_i^c$ corresponding to the track point $L_i^c$ collected by crowdsourcing, and an image set $\mathcal{J}_i^p$ corresponding to the candidate track point set $\mathcal{L}_i^p$, image features are extracted by using a model of local feature point matching based on attention mechanism (DELF, DEep Local Features), the feature matching degree of image pairs extracted from $I_i^c$ and $\mathcal{J}_i^p$ is calculated in pairs, the random sampling consensus algorithm (RANSAC) is used to perform geometric verification, the number of inliers is used to represent an image matching score, and the matching scores are normalized to [0-100] for ease of measurement.

Finally, using the above method, for the track point $L_i^c$, a score $\{s_{i,1}^p, s_{i,2}^p, \ldots, s_{i,K}^p\}$ of the track point with each track point in $\mathcal{L}_i^p$ may be calculated, and the score may be used as the track point matching degree, and the matching degree may be determined based on the score.

Correspondingly, the subsequent Kalman filtering stage is also changed accordingly to: first, based on the score $\{s_{i,1}^p, s_{i,2}^p, \ldots, s_{i,K}^p\}$, probability score calibration is performed on the location of the single track point, and the calibrated position, the variance, and the probability of each track point are output; then, the variance of the probability model is used as the confidence indicator, which is fused into Kalman filtering, and the position, the variance, and the velocity are used as outputs to reconstruct the track, to realize continuous track rectification based on Kalman filtering, and finally obtain a rectified sequence $\overline{\mathcal{L}^c}$ from $\mathcal{L}^c$.

The step 601 to step 607 may also be converted into a schematic diagram as shown in FIG. 7, so as to define the input, output and purpose of each step more intuitively.

For the change analysis link, steps 202 to 204 of the flow 200 will be described in detail as follows:

Step 202: comparing a latest map element obtained based on the rectified crowdsourcing tracks locating and an old map element at a corresponding locating position using a pre-built entity semantic map.

This step aims to change the change analysis from a simple comparison based on position and road network map in the traditional mode to change analysis based on an entity semantic map. The entity semantic map is a modeling of real-world entities, which may solve the problem of map data expression escaping. At the same time, the entity semantic map not only contains position information, but also identifies detailed types of elements and fine-grained attribute information through element classification, semantic identification, etc., and acquires image features of the elements based on a method of representation learning. Based on position and multi-dimensional attribute features, it may solve the problem of low accuracy of change determination caused by based simply on position.

Through image semantic segmentation technology, the analysis of multi-dimensional scenarios in images is realized. For example, by judging a relationship between an angle and orientation of an electronic eye, and the ground and area, it may be determined whether the electronic eye acts on a motor vehicle lane, a non-motor vehicle lane, or a community; by identifying a relationship between a speed limit sign and the ground, and whether a surrounding area is in construction, it may be determined whether a speed limit is a normal speed limit, a temporary speed limit or a construction speed limit.

Figure 8:
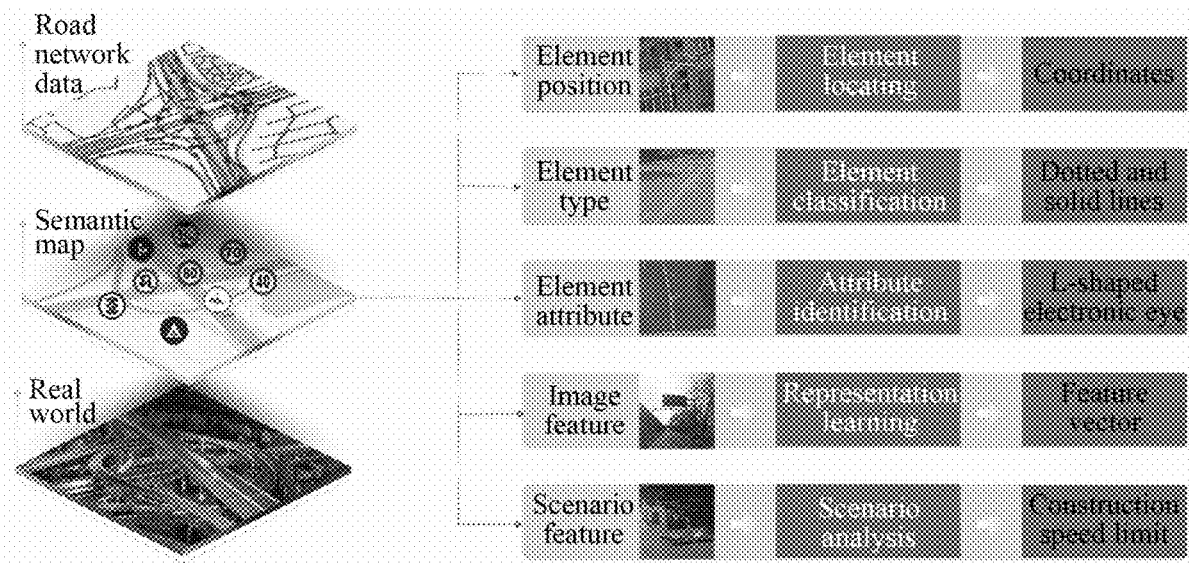
FIG. 8 is a schematic diagram of constructing an entity semantic map according to an embodiment of the present disclosure.

Specifically, multi-dimensional semantic features of real-world elements are constructed, and realistic scenarios of the elements are reconstructed by obtaining attribute identification of the elements based on image identification, image classification and semantic segmentation, obtaining image features of the elements based on image representation learning, and obtaining scenario features of the elements based on image scenario analysis, and a large-scale entity semantic map is acquired using the above method. Through the entity semantic map method, the real world and the road network data are bridged. Through innovation of this mode, a highly automated data production capability is realized, and an overall framework is as shown in FIG. 8.

Step 203: determining, in response to a change in the latest map element compared to the old map element, a target processing method according to a processing standard of a changed map element pre-abstracted from a map element update specification.

A method for determining whether a map element changes based on scenario analysis is as follows.

An attribute set $A=\{A_1, A_2, \ldots, A_N\}$ has N attributes in total, where $A_i \in \mathbb{R}$, $0 \leq i \leq N$. A includes all attributes of all elements, for example, whether an element type is speed limit, and attributes such as a speed limit type (normal speed limit, interval speed limit-start, interval speed limit-end, etc.), a vehicle type (car, truck, etc.); whether the element type is electronic eye, and attributes such as a type of electronic eye (ball, gun, etc.), a rod type (L type, Y type, etc.); whether the element type is a lane line, and attributes such as a lane line shape (solid line, dotted line, left solid and right dotted, etc.), a color (yellow, white, etc.); other elements are similar and will not be enumerated herein. An attribute vector for each element is: $A_2 \times \ldots \times A_N$, $a \in \mathbb{R}^N$;

An image feature set R has M feature vectors in total, and each feature vector is a D-dimensional vector, $R \subseteq \mathbb{R}^{D \times M}$ Different image feature vectors may be obtained by selecting different feature extraction methods or extracted from images of different scales;

For a certain element e and its coordinate position $L_e$ obtained in the links of "detection and identification" and "element locating", a candidate element set C in the entity semantic map: $C=\{c \in E | d(L_e, L_c) \leq d_t\}$ may be acquired by the coordinate position within a certain range of threshold in the entity semantic map; where, E is a set of all elements in the entity semantic map, $d(*)$ is a distance calculation method, the Euclidean distance may be chosen, and $d_t$ is a distance threshold, which limits a candidate range selected for making change determination, such as 20 m or 50 m, assuming K=|C|.

Based on "attribute identification" and "representation learning", an attribute vector $a_e$ and an image feature set $R_e$ of the element e may be obtained, and an attribute vector set corresponding to the candidate element set C is: $a_C = \{a_1, a_2, \ldots, a_K\}$, and an image feature set $R_C = \{R_1, R_2, \ldots, R_K\}$ may be obtained, whether the element e and a certain candidate element c are the same element may be calculated by: $P(e=c) = f(a_e, R_e, a_c, R_c)$; and $f(*)$ may be calculated by:

$$f(a_e, R_e, a_c, R_c) = \alpha * \frac{\sum_{i=1}^{N} \beta_i s_a(e_i, c_i)}{\sum_{k=1}^{N} \beta_i} + (1-\alpha) * \frac{\sum_{i=1}^{M} \gamma_i s_R(R_e, R_{c,i})}{\sum_{k=1}^{M} \gamma_i};$$

$$s_a(x, y) = \begin{cases} 1, & \text{if } x == y \\ 0, & \text{otherwise} \end{cases}, s_R(x, y) = \cos(x, y).$$

where, $\alpha$ is an attribute feature similarity weight, which may be set to 0.5 by default, $\beta_i$ is a weight of the $i^{th}$ attribute feature, which may be set to 1 by default, $(1-\alpha)$ is an image feature similarity weight, $\gamma_i$ is a weight of the $i^{th}$ image feature, which may be set to 1 by default. f(*) may also be defined as other linear function or nonlinear function, which may be learned through a large number of real samples manually labeled.

Calculating the probability of whether the element e and each element in the candidate element set C are the same element by the above method, and determining a state of the element by the following method:

$$G(e) =$$
$$f(x) = \begin{cases} U(nchanged), & \text{if } \exists\, c \in C, P(e = c) \geq p_{t1} \\ M(odified), & \text{elif } \exists\, c \in C, P(e = c) \geq p_{t2} \text{ and } T(e) == T(c) \\ A(dded), & \text{otherwise} \end{cases}$$

where, $p_{t1}$ and $p_{t2}$ are thresholds of Unchanged and Modified respectively, which may be adjusted based on actual distribution, and T(*) is an element type function, such as electronic eye, speed limit. If there is no element in the candidate element set C that exceeds a certain probability threshold with the element e, the element e is an added element.

In addition to added and modified in element change, there is deleted. Deleted may be regarded as a newly added inverse operation. Based on the elements in an element map and performing the above operation in current newly collected data, it may be determined whether it is deleted. Therefore, deleted will not be described separately.

Step 204: processing the latest map element according to the target processing method to obtain a processed latest map.

In order to better understand the attribute identification, image classification, and semantic segmentation technologies used in constructing the entity semantic map, a method for acquiring an attribute feature through attribute identification and a method for acquiring an image feature through representation learning will be introduced in detail below.

1. Attribute Identification

A process of attribute identification, which is a process of extracting attribute values of different attributes in a preset attribute set A based on the image, and may be expressed as a set of functions: $\mathcal{F} = \{f_1, f_2, \ldots, f_n\}$, $f_k: I \to A$, $1 \leq k \leq n$.

Each function $f_k$ may be implemented based on an image classification model, an image semantic segmentation model, or a combination of the two. For example, the rod-shape, L-shaped rod or Y-shaped rod of the electronic eye, a bounding box of the element may be obtained through detection and identification, classified as the electronic eye through image classification, and a rod-shaped object is segmented through semantics segmentation. Combining a relationship between the electronic eye type and the segmented rod-shaped object, a rod connected to the electronic eye is obtained, and the rod shape is determined to be Y-shaped or L-shaped by a shape of the segmented rod. The attribute identification of other elements may follow the same idea.

2. Representation Learning

Image features are acquired through representation learning of images, which may be extracted using different feature extraction methods such as a traditional keypoint detection-based method (such as SIFT, SURF), deep learning-based method (such as Siamese Resnet, DELF), or extracted from images of different scales such as element bounding box area images, local images containing part of the background, or full images.

Taking the element as a local image containing part of the background and using the deep learning-based method as an example, a whole process mainly includes the following parts.

Sample construction method: selecting images of the same element, of different photographing times, and of different photographing angles from data collected multiple times as positive samples. Negative samples are acquired in several methods: adjacent elements within a certain range, elements in other locations of the same type, or random elements.

A deep neural network model of Siamese Resnet is used to learn to obtain representation features, a loss function:

$$\mathcal{L}_{msml} = \left( \max_{a,p} d_{a,p} - \min_{m,n} d_{m,n} + \alpha \right)_+ ;$$

where $(\ )_+$ indicates $\max(z, 0)$, and a, p, m and n are all images in batch, a, p are the most dissimilar positive sample pair in batch, m, n are the most similar negative sample pair in batch, and a is a threshold designed according to actual needs.

Based on a trained network, a photo of selected scale is input into the network, and a vector of the last layer may be used as the feature vector of the image. Based on the above method, an image feature of the element may be acquired, and other image features may be extracted using a similar process, detailed description thereof will be omitted.

On this basis, the part for determining a change processing method provided in step 702 is actually to determine a processing method that conforms to the specification, which may also be understood as: based on the production standard of navigation electronic map data, it is determined whether the element that is considered as changed after the "change determination" conforms to the map element update specification.

For all changes of all map elements, a standard set may be constructed: $S = \{s_1, s_2, \ldots, s_m\}$, then there is a function $\emptyset: S \to \{0, 1\}$;

$$\emptyset(s) = \begin{cases} 1, & \text{if } s \in S \text{ and conform to the standard } s \text{ map element update specification} \\ 0, & \text{otherwise} \end{cases}.$$

Then, the process of determining whether the change conforms to the map element update specification is the process of extracting attribute values of different attributes in the preset attribute set A based on the image, which may be expressed as a set of functions: $\mathcal{H} = \{h_1, h_2, \ldots, h_n\}$, $h_k: I \to S$, $1 \leq k \leq m$.

Each function $h_k$ is a comprehensive application of vision algorithms. Taking a standard $s_i$ "if an electronic eye acts on a non-motorized vehicle lane, it has no update value" as an example, for an electronic eye that has been determined to be changed through the above link, an image I that may identify the electronic eye is acquired. First, through semantic segmentation, a road surface and lane in the image are segmented, and at the same time actual OCR (Optical Character Recognition) may recognize a type of the lane as a motor vehicle lane or a non-motor vehicle lane. The orientation and angle of the electronic eye are determined by the bounding box of the electronic eye, and based on an angle relationship between the orientation and the angle and the ground, it is determined whether the electronic eye acts on a non-motorized vehicle lane. If the electronic eye acts on a non-motorized lane, the standard $s_i$ is met, then the change of the electronic eye is a valueless change under the map element update specification, that is, $\emptyset(h_k(I))=\emptyset(s_i)=0$.

That is, the solution provided in steps 202 to 204 is a process model innovation based on change analysis of large-scale entity semantic map, through the change determination of element attribute features and image features, and the change value determination of image scenario analysis, an automation effect of the change analysis is significantly improved.

Combining the improvement in the "map element locating" link and the improvement in the "determining whether the change conforms to the map element update specification" link, an automated production system for map data may be built to automatically discover and update elements of map data changes, including but not limited to "lane line", "lane turning information (vehicle information)", "traffic restrictions", "electronic eye", "traffic light", etc.

The system for automatically producing map data, through the integration of AI application and process innovation, realizes a fully automatic map data production system, which not only effectively solves the efficiency and quality problems caused by the traditional mode relying heavily on manual labor, but also greatly improves map data production efficiency, is a milestone change in map data production. It is of great significance to enhance the user experience of using maps and gives full play to the value of maps as a digital base for new infrastructure.

Figure 9:
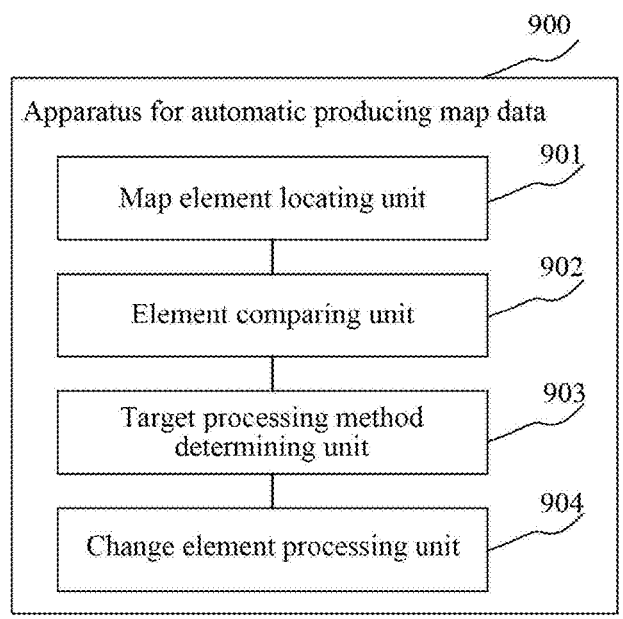
FIG. 9 is a structural block diagram of an apparatus for automatically producing map data according to an embodiment of the present disclosure.

With further reference to FIG. 9, as an implementation of the method shown in the above figures, the present disclosure provides an apparatus for automatically producing map data. The embodiment of the apparatus corresponds to the embodiment of the method shown in FIG. 2. The apparatus may be specifically applied to various electronic devices.

As shown in FIG. 9, an apparatus 900 for automatically producing map data of the present embodiment may include: a map element locating unit 901, an element comparing unit 902, a target processing method determining unit 903 and a change element processing unit 904. The map element locating unit 901 is configured to perform track rectification on crowdsourcing tracks based on corresponding standard tracks, and locate each map element in track point images included in the rectified crowdsourcing tracks, based on depth information of the track point images included in the rectified crowdsourcing tracks. The element comparing unit 902 is configured to compare a latest map element obtained based on the rectified crowdsourcing tracks locating and an old map element at a corresponding locating position using a pre-built entity semantic map. The target processing method determining unit 903 is configured to determine, in response to a change in the latest map element compared to the old map element, a target processing method according to a processing standard of a changed map element pre-abstracted from a map element update specification. The change element processing unit 904 is configured to process the latest map element according to the target processing method to obtain a processed latest map.

In some embodiments, the map element locating unit 901 includes: a track acquiring subunit, a crowdsourcing track rectification subunit, a depth information determining subunit, and a map element locating subunit.

The track acquiring subunit is configured to acquire crowdsourcing tracks and standard tracks respectively collected for a same area, the crowdsourcing tracks and the standard tracks both including a plurality of track points, and each track point corresponding to at least one track point image. The crowdsourcing track rectification subunit is configured to rectify the crowdsourcing tracks based on matched image features in corresponding track point images between the crowdsourcing tracks and the standard tracks, to obtain the rectified crowdsourcing tracks. The depth information determining subunit is configured to determine depth information of each map element in the track point images included in the rectified crowdsourcing tracks. The map element locating subunit is configured to locate each of the map element based on the depth information.

In the present embodiment, in the apparatus 900 for automatically producing map data: for the specific processing and the technical effects of the map element locating unit 901, the element comparing unit 902, the target processing method determining unit 903 and the change element processing unit 904, reference may be made to the relevant descriptions of steps 201-204 in the corresponding embodiment of FIG. 2, respectively, and detailed description thereof will be omitted.

In some alternative implementations of the present embodiment, the track acquiring subunit may be further configured to: acquire crowdsoucing tracks of a target area collected by crowdsourcing users through personal devices, where the crowdsourcing tracks include a plurality of crowdsourcing track points, and each of the crowdsourcing track points corresponds to at least one crowdsourcing image; and acquire standard tracks of the target area collected by professional equipment, where the standard tracks include a plurality of standard track points, and each of the standard track points corresponds to at least one standard image.

In some alternative implementations of the present embodiment, the crowdsourcing track rectification subunit may be further configured to: perform a preset single-track point matching operation on each of the crowdsourcing track points to obtain a track point matching degree between each of the crowdsourcing track points in the crowdsourcing tracks and each candidate track point; the single-track point matching operation includes: determining a standard track point whose distance from the current crowdsourcing track point does not exceed a preset distance as a candidate track point; extracting respectively from a crowdsourcing image corresponding to the current crowdsourcing track point and a standard image corresponding to the candidate track point, to obtain a crowdsourcing image feature and a standard image feature; and determining the track point matching degree between the current crowdsourcing track point and the candidate track point, based on a feature matching degree between the crowdsourcing image feature and the standard image feature; perform probability calibration on a location of each of the crowdsourcing track points based on the track matching degree, to obtain a calibrated position, a variance, and a probability of each of the crowdsourcing track points; and fuse the variance as a confidence parameter of a probability model into Kalman filtering, and reconstruct each of the crowdsourcing track points based on a filtered position, the variance, and velocity to obtain the rectified crowdsourcing tracks.

In some alternative implementations of the present embodiment, the crowdsourcing track rectification subunit may include a single-track point matching module configured to perform the single-track point matching operation, the single-track point matching module may include an image feature extraction submodule configured to extract respectively from a crowdsourcing image corresponding to the current crowdsourcing track point and a standard image corresponding to the candidate track point, to obtain a crowdsourcing image feature and a standard image feature, and the image feature extraction submodule may be further configured to: input the crowdsourcing image corresponding to the current crowdsourcing track point and the standard image corresponding to the candidate track point respectively into a pre-built model of local feature point matching based on attention mechanism; and acquire the crowdsourcing image feature and the standard image feature output by the model, respectively.

In some alternative implementations of the present embodiment, the crowdsourcing track rectification subunit may include a single-track point matching module configured to perform the single-track point matching operation, the single-track point matching module may include a track point matching degree determining submodule configured to determine the track point matching degree between the current crowdsourcing track point and the candidate track point, based on a feature matching degree between the crowdsourcing image feature and the standard image feature, and the track point matching submodule may be further configured to: calculate an initial feature matching degree between the crowdsourcing image feature and the standard image feature; perform geometric verification on the crowdsourcing image feature and the standard image feature using a random sampling consensus algorithm, and use the number of inliers as a geometric verification result; normalize the geometric verification result to obtain a normalized geometric verification result having a same metric as the initial feature matching degree; determine a final feature matching degree based on the initial feature matching degree and the normalized geometric verification result; and determine the track point matching degree between the current crowdsourcing track point and the candidate track point based on the final feature matching degree.

In some alternative implementations of the present embodiment, the depth information determining unit may be further configured to: input the track point images included in the rectified crowdsourcing tracks into a preset depth estimation model, where the depth estimation model is used to represent a corresponding relationship between a map image and depth information of a map element, train to obtain input samples in training samples of the depth estimation model as image data, and output samples as a depth map, and the depth map is obtained by registering point cloud data with the image data; and acquire the depth information of the corresponding map element output by the depth estimation model.

In some alternative implementations of the present embodiment, the apparatus 900 for automatically producing map data may further include: an attribute identifying unit, configured to identify an attribute of each map element based on image identification, image classification and semantic segmentation technologies; and an entity semantic map constructing unit, configured to determine a multi-dimensional semantic feature, based on an image feature of the map element obtained based on an image representation learning method and a scenario feature of the map obtained based on image scenario analysis, and construct to obtain the entity semantic map based on the multi-dimensional semantic feature.

The present embodiment serves as an apparatus embodiment corresponding to the above method embodiment.

In order to better realize automatic production of map data, the present apparatus embodiment disassembles it into two parts in sequence, that is, for a previous map element locating part, massive but imprecise crowdsourcing tracks are rectified by a small number of but accurate standard tracks, and at the same time, depth information is combined to achieve more accurate locating of map elements; for a latter map element change and update part, an entity semantic map that connects the real world and road network data from the semantic level is used to better determine a map elements with change, and finally complete reasonable update of the changed map element according to the target processing method determined from the processing standard of the changed map element, so as to improve an automatically production efficiency and accuracy of map data.

According to an embodiment of the present disclosure, the present disclosure also provides an electronic device, the electronic device including: at least one processor; and a memory communicatively connected to the at least one processor. The memory stores instructions executable by the at least one processor, and the instructions, when executed by the at least one processor, cause the at least one processor to perform the method for automatically producing map data described in any of the above embodiments.

According to an embodiment of the present disclosure, the present disclosure also provides a computer readable storage medium storing computer instructions, and the computer instructions are used to cause the computer to perform the method for automatically producing map data described in any of the above embodiments.

According to an embodiment of the present disclosure, the present disclosure also provides a computer program, the computer program, when executed by a processor, implements the method for automatically producing map data described in any of the above embodiments.

Figure 10:
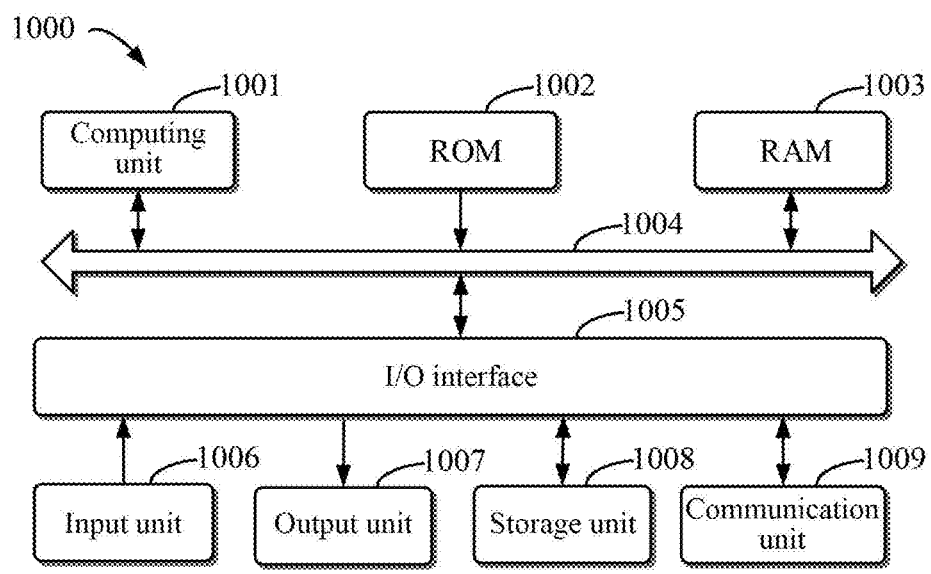
FIG. 10 is a schematic structural diagram of an electronic device suitable for performing the method for automatically producing map data according to an embodiment of the present disclosure.

FIG. 10 illustrates a schematic block diagram of an example electronic device 1000 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 10, the electronic device 1000 includes a computing unit 1001, which may perform various appropriate actions and processing, based on a computer program stored in a read-only memory (ROM) 1002 or a computer program loaded from a storage unit 1008 into a random access memory (RAM) 1003. In the RAM 1003, various programs and data required for the operation of the device 1000 may also be stored. The computing unit 1001, the ROM 1002, and the RAM 1003 are connected to each other through a bus 1004. An input/output (I/O) interface 1005 is also connected to the bus 1004.

A plurality of parts in the device 1000 are connected to the I/O interface 1005, including: an input unit 1006, for example, a keyboard and a mouse; an output unit 1007, for example, various types of displays and speakers; the storage unit 1008, for example, a disk and an optical disk; and a communication unit 1009, for example, a network card, a modem, or a wireless communication transceiver. The communication unit 1009 allows the device 1000 to exchange information/data with other devices over a computer network such as the Internet and/or various telecommunication networks.

The computing unit 1001 may be various general-purpose and/or dedicated processing components having processing and computing capabilities. Some examples of the computing unit 1001 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computing unit 1001 performs the various methods and processes described above, such as the method for automatically producing map data. For example, in some embodiments, the method for automatically producing map data may be implemented as a computer software program, which is tangibly included in a machine readable medium, such as the storage unit 1008. In some embodiments, part or all of the computer program may be loaded and/or installed on the device 1000 via the ROM 1002 and/or the communication unit 1009. When the computer program is loaded into the RAM 1003 and executed by the computing unit 1001, one or more steps of the method for automatically producing map data described above may be performed. Alternatively, in other embodiments, the computing unit 1001 may be configured to perform the method for automatically producing map data by any other appropriate means (for example, by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or a cloud host, which is a host product in the cloud computing service system to solve the defects of large management difficulties and weak business expansion in traditional physical host and virtual private server (VPS, Virtual Private Server) services.

In order to better realize automatically production of map data, the present embodiment disassembles it into two parts in sequence, that is, for a previous map element locating part, massive but imprecise crowdsourcing tracks are rectified by a small number of but accurate standard tracks, and at the same time, depth information is combined to achieve more accurate locating of map elements; for a latter map element change and update part, an entity semantic map that connects the real world and road network data from the semantic level is used to better determine a map elements with change, and finally complete reasonable update of the changed map element according to the target processing method determined from the processing standard of the changed map element, so as to improve an automatic production efficiency and accuracy of map data.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for automatically producing map data, the method comprising:
    performing track rectification on crowdsourcing tracks based on corresponding standard tracks, and locating each map element in track point images included in the rectified crowdsourcing tracks, based on depth information of the track point images;
    comparing a latest map element obtained based on the rectified crowdsourcing tracks locating and an old map element at a corresponding locating position using a pre-built entity semantic map;
    determining, in response to a change in the latest map element compared to the old map element, a target processing method according to a processing standard of a changed map element pre-abstracted from a map element update specification; and
    processing the latest map element according to the target processing method to obtain a processed latest map.

2. The method according to claim 1, wherein the performing track rectification on crowdsourcing tracks based on corresponding standard tracks, and locating each map element in track point images included in the rectified crowdsourcing tracks, based on depth information of the track point images, comprises:
    acquiring crowdsourcing tracks and standard tracks respectively collected for a same area, the crowdsourcing tracks and the standard tracks both comprising a plurality of track points, and each track point corresponding to at least one track point image;
    rectifying the crowdsourcing tracks based on matched image features in corresponding track point images between the crowdsourcing tracks and the standard tracks, to obtain the rectified crowdsourcing tracks;
    determining depth information of each map element in the track point images included in the rectified crowdsourcing tracks; and
    locating each of the map element based on the depth information.

3. The method according to claim 2, wherein the acquiring crowdsourcing tracks and standard tracks respectively collected for a same area, comprises:
    acquiring crowdsourcing tracks of a target area collected by crowdsourcing users through personal devices, wherein the crowdsourcing tracks comprise a plurality of crowdsourcing track points, and each of the crowdsourcing track points corresponds to at least one crowdsourcing image; and
    acquiring standard tracks of the target area collected by professional equipment, wherein the standard tracks comprise a plurality of standard track points, and each of the standard track points corresponds to at least one standard image.

4. The method according to claim 3, wherein the rectifying the crowdsourcing tracks based on matched image features in corresponding track point images between the crowdsourcing tracks and the standard tracks, to obtain the rectified crowdsourcing tracks, comprises:
    performing a preset single-track point matching operation on each of the crowdsourcing track points to obtain a track point matching degree between each of the crowdsourcing track points in the crowdsourcing tracks and each candidate track point;
    wherein the single-track point matching operation comprises: determining a standard track point whose distance from the current crowdsourcing track point does not exceed a preset distance as a candidate track point; extracting respectively from a crowdsourcing image corresponding to the current crowdsourcing track point and a standard image corresponding to the candidate track point, to obtain a crowdsourcing image feature and a standard image feature; and determining the track point matching degree between the current crowdsourcing track point and the candidate track point, based on a feature matching degree between the crowdsourcing image feature and the standard image feature;
    performing probability calibration on a location of each of the crowdsourcing track points based on the track matching degree, to obtain a calibrated position, a variance, and a probability of each of the crowdsourcing track points; and
    fusing the variance as a confidence parameter of a probability model into Kalman filtering, and reconstructing each of the crowdsourcing track points based on a filtered position, the variance, and velocity to obtain the rectified crowdsourcing tracks.

5. The method according to claim 4, wherein the extracting respectively from a crowdsourcing image corresponding to the current crowdsourcing track point and a standard image corresponding to the candidate track point, to obtain a crowdsourcing image feature and a standard image feature, comprises:
    inputting the crowdsourcing image corresponding to the current crowdsourcing track point and the standard image corresponding to the candidate track point respectively into a pre-built model of local feature point matching based on attention mechanism; and
    acquiring the crowdsourcing image feature and the standard image feature output by the model, respectively.

6. The method according to claim 4, wherein the determining the track point matching degree between the current crowdsourcing track point and the candidate track point, based on a feature matching degree between the crowdsourcing image feature and the standard image feature, comprises:
    calculating an initial feature matching degree between the crowdsourcing image feature and the standard image feature;
    performing geometric verification on the crowdsourcing image feature and the standard image feature using a random sampling consensus algorithm, and using a number of inliers as a geometric verification result;
    normalizing the geometric verification result to obtain a normalized geometric verification result having a same metric as the initial feature matching degree;
    determining a final feature matching degree based on the initial feature matching degree and the normalized geometric verification result; and determining the track point matching degree between the current crowdsourcing track point and the candidate track point based on the final feature matching degree.

7. The method according to claim 2, wherein the determining depth information of each map element in the track point images included in the rectified crowdsourcing tracks, comprises:

inputting the track point images included in the rectified crowdsourcing tracks into a preset depth estimation model, wherein the depth estimation model is used to represent a corresponding relationship between a map image and depth information of a map element, training to obtain input samples in training samples of the depth estimation model as image data, and output samples as a depth map, and the depth map is obtained by registering point cloud data with the image data; and acquiring the depth information of the corresponding map element output by the depth estimation model.

8. The method according to claim 1, wherein the method further comprises:

identifying an attribute of each map element based on image identification, image classification and semantic segmentation technologies; and determining a multi-dimensional semantic feature, based on an image feature of the map element obtained based on an image representation learning method and a scenario feature of the map obtained based on image scenario analysis, and constructing to obtain the entity semantic map based on the multi-dimensional semantic feature.

9. An electronic device, comprising:

at least one processor; and a memory communicatively connected to the at least one processor;

wherein the memory stores instructions executable by the at least one processor, and the instructions, when executed by the at least one processor, cause the at least one processor to perform operations, the operations comprising:

performing track rectification on crowdsourcing tracks based on corresponding standard tracks, and locating each map element in track point images included in the rectified crowdsourcing tracks, based on depth information of the track point images;

comparing a latest map element obtained based on the rectified crowdsourcing tracks locating and an old map element at a corresponding locating position using a pre-built entity semantic map;

determining, in response to a change in the latest map element compared to the old map element, a target processing method according to a processing standard of a changed map element pre-abstracted from a map element update specification; and processing the latest map element according to the target processing method to obtain a processed latest map.

10. The electronic device according to claim 9, wherein the performing track rectification on crowdsourcing tracks based on corresponding standard tracks, and locating each map element in track point images included in the rectified crowdsourcing tracks, based on depth information of the track point images, comprises:

acquiring crowdsourcing tracks and standard tracks respectively collected for a same area, the crowdsourcing tracks and the standard tracks both comprising a plurality of track points, and each track point corresponding to at least one track point image;

rectifying the crowdsourcing tracks based on matched image features in corresponding track point images between the crowdsourcing tracks and the standard tracks, to obtain the rectified crowdsourcing tracks;

determining depth information of each map element in the track point images included in the rectified crowdsourcing tracks; and locating each of the map element based on the depth information.

11. The electronic device according to claim 10, wherein the acquiring crowdsourcing tracks and standard tracks respectively collected for a same area, comprises:

acquiring crowdsourcing tracks of a target area collected by crowdsourcing users through personal devices, wherein the crowdsourcing tracks comprise a plurality of crowdsourcing track points, and each of the crowdsourcing track points corresponds to at least one crowdsourcing image; and acquiring standard tracks of the target area collected by professional equipment, wherein the standard tracks comprise a plurality of standard track points, and each of the standard track points corresponds to at least one standard image.

12. The electronic device according to claim 11, wherein the rectifying the crowdsourcing tracks based on matched image features in corresponding track point images between the crowdsourcing tracks and the standard tracks, to obtain the rectified crowdsourcing tracks, comprises:

performing a preset single-track point matching operation on each of the crowdsourcing track points to obtain a track point matching degree between each of the crowdsourcing track points in the crowdsourcing tracks and each candidate track point;

wherein the single-track point matching operation comprises: determining a standard track point whose distance from the current crowdsourcing track point does not exceed a preset distance as a candidate track point; extracting respectively from a crowdsourcing image corresponding to the current crowdsourcing track point and a standard image corresponding to the candidate track point, to obtain a crowdsourcing image feature and a standard image feature; and determining the track point matching degree between the current crowdsourcing track point and the candidate track point, based on a feature matching degree between the crowdsourcing image feature and the standard image feature;

performing probability calibration on a location of each of the crowdsourcing track points based on the track matching degree, to obtain a calibrated position, a variance, and a probability of each of the crowdsourcing track points; and fusing the variance as a confidence parameter of a probability model into Kalman filtering, and reconstructing each of the crowdsourcing track points based on a filtered position, the variance, and velocity to obtain the rectified crowdsourcing tracks.

13. The electronic device according to claim 12, wherein the extracting respectively from a crowdsourcing image corresponding to the current crowdsourcing track point and a standard image corresponding to the candidate track point, to obtain a crowdsourcing image feature and a standard image feature, comprises:

inputting the crowdsourcing image corresponding to the current crowdsourcing track point and the standard image corresponding to the candidate track point respectively into a pre-built model of local feature point matching based on attention mechanism; and acquiring the crowdsourcing image feature and the standard image feature output by the model, respectively.

14. The electronic device according to claim 12, wherein the determining the track point matching degree between the current crowdsourcing track point and the candidate track point, based on a feature matching degree between the crowdsourcing image feature and the standard image feature, comprises:
   calculating an initial feature matching degree between the crowdsourcing image feature and the standard image feature;
   performing geometric verification on the crowdsourcing image feature and the standard image feature using a random sampling consensus algorithm, and using a number of inliers as a geometric verification result;
   normalizing the geometric verification result to obtain a normalized geometric verification result having a same metric as the initial feature matching degree;
   determining a final feature matching degree based on the initial feature matching degree and the normalized geometric verification result; and
   determining the track point matching degree between the current crowdsourcing track point and the candidate track point based on the final feature matching degree.

15. The electronic device according to claim 10, wherein the determining depth information of each map element in the track point images included in the rectified crowdsourcing tracks, comprises:
   inputting the track point images included in the rectified crowdsourcing tracks into a preset depth estimation model, wherein the depth estimation model is used to represent a corresponding relationship between a map image and depth information of a map element, training to obtain input samples in training samples of the depth estimation model as image data, and output samples as a depth map, and the depth map is obtained by registering point cloud data with the image data; and
   acquiring the depth information of the corresponding map element output by the depth estimation model.

16. The electronic device according to claim 9, wherein the operations further comprise:
   identifying an attribute of each map element based on image identification, image classification and semantic segmentation technologies; and
   determining a multi-dimensional semantic feature, based on an image feature of the map element obtained based on an image representation learning method and a scenario feature of the map obtained based on image scenario analysis, and constructing to obtain the entity semantic map based on the multi-dimensional semantic feature.

17. A non-transitory computer readable storage medium storing computer instructions, wherein, the computer instructions, when executed by at least one processor, cause the at least one processor to perform operations, the operations comprising:
   performing track rectification on crowdsourcing tracks based on corresponding standard tracks, and locating each map element in track point images included in the rectified crowdsourcing tracks, based on depth information of the track point images;
   comparing a latest map element obtained based on the rectified crowdsourcing tracks locating and an old map element at a corresponding locating position using a pre-built entity semantic map;
   determining, in response to a change in the latest map element compared to the old map element, a target processing method according to a processing standard of a changed map element pre-abstracted from a map element update specification; and
   processing the latest map element according to the target processing method to obtain a processed latest map.

18. The non-transitory computer readable storage medium according to claim 17, wherein the performing track rectification on crowdsourcing tracks based on corresponding standard tracks, and locating each map element in track point images included in the rectified crowdsourcing tracks, based on depth information of the track point images, comprises:
   acquiring crowdsourcing tracks and standard tracks respectively collected for a same area, the crowdsourcing tracks and the standard tracks both comprising a plurality of track points, and each track point corresponding to at least one track point image;
   rectifying the crowdsourcing tracks based on matched image features in corresponding track point images between the crowdsourcing tracks and the standard tracks, to obtain the rectified crowdsourcing tracks;
   determining depth information of each map element in the track point images included in the rectified crowdsourcing tracks; and
   locating each of the map element based on the depth information.

19. The non-transitory computer readable storage medium according to claim 18, wherein the acquiring crowdsourcing tracks and standard tracks respectively collected for a same area, comprises:
   acquiring crowdsourcing tracks of a target area collected by crowdsourcing users through personal devices, wherein the crowdsourcing tracks comprise a plurality of crowdsourcing track points, and each of the crowdsourcing track points corresponds to at least one crowdsourcing image; and
   acquiring standard tracks of the target area collected by professional equipment, wherein the standard tracks comprise a plurality of standard track points, and each of the standard track points corresponds to at least one standard image.

20. The non-transitory computer readable storage medium according to claim 19, wherein the rectifying the crowdsourcing tracks based on matched image features in corresponding track point images between the crowdsourcing tracks and the standard tracks, to obtain the rectified crowdsourcing tracks, comprises:
   performing a preset single-track point matching operation on each of the crowdsourcing track points to obtain a track point matching degree between each of the crowdsourcing track points in the crowdsourcing tracks and each candidate track point;
   wherein the single-track point matching operation comprises: determining a standard track point whose distance from the current crowdsourcing track point does not exceed a preset distance as a candidate track point; extracting respectively from a crowdsourcing image corresponding to the current crowdsourcing track point and a standard image corresponding to the candidate track point, to obtain a crowdsourcing image feature and a standard image feature; and determining the track point matching degree between the current crowdsourcing track point and the candidate track point, based on a feature matching degree between the crowdsourcing image feature and the standard image feature;
   performing probability calibration on a location of each of the crowdsourcing track points based on the track matching degree, to obtain a calibrated position, a variance, and a probability of each of the crowdsourcing track points; and fusing the variance as a confidence parameter of a probability model into Kalman filtering, and reconstructing each of the crowdsourcing track points based on a filtered position, the variance, and velocity to obtain the rectified crowdsourcing tracks.

* * * * *